United States Patent
Hug

(10) Patent No.: US 9,205,829 B2
(45) Date of Patent: Dec. 8, 2015

(54) METHOD FOR OPERATING A TRACTION VEHICLE AND A TRACTION VEHICLE

(71) Applicant: MTU Friedrichshafen GmbH, Friedrichshafen (DE)

(72) Inventor: Joachim Hug, Friedrichshafen (DE)

(73) Assignee: MTU FRIEDRICHSHAFEN GMBH, Friedrichshafen (DE)

( * ) Notice: Subject to any disclaimer, the term of this patent is extended or adjusted under 35 U.S.C. 154(b) by 102 days.

(21) Appl. No.: 14/100,176

(22) Filed: Dec. 9, 2013

(65) Prior Publication Data

US 2014/0162836 A1    Jun. 12, 2014

(30) Foreign Application Priority Data

Dec. 7, 2012  (DE) .......................... 10 2012 222 514

(51) Int. Cl.
*B60W 20/00* (2006.01)
*B60W 10/06* (2006.01)

(52) U.S. Cl.
CPC ............... *B60W 20/10* (2013.01); *B60W 10/06* (2013.01); *B60L 2200/26* (2013.01); *Y02T 10/7241* (2013.01); *Y10S 903/902* (2013.01); *Y10T 477/23* (2015.01)

(58) Field of Classification Search
CPC ............................... Y02T 30/16; B60W 20/10
USPC ......................................................... 290/4 R
See application file for complete search history.

(56) References Cited

U.S. PATENT DOCUMENTS

| | | | | |
|---|---|---|---|---|
| 7,309,929 | B2 * | 12/2007 | Donnelly et al. | 290/4 R |
| 7,349,797 | B2 * | 3/2008 | Donnelly et al. | 701/115 |
| 7,667,347 | B2 * | 2/2010 | Donnelly et al. | 307/10.1 |
| 8,220,572 | B2 * | 7/2012 | Donnelly | 180/65.265 |

FOREIGN PATENT DOCUMENTS

WO    2008089571    7/2008

OTHER PUBLICATIONS

Antriebs—Workshop "Schienenberkehr" Fachdialog Zur Mobilitäts—Und Kraftstpffstrategie, Jun. 2012.
G&W, "GENSET" Locomotives, 2012.
Railomotive, Eisenbahn-Blog Friedhelm Weidelich-Fachjournalist, 2011.

* cited by examiner

*Primary Examiner* — Sherry Estremsky
(74) *Attorney, Agent, or Firm* — Lucas & Mercanti, LLP; Klaus P. Stoffel

(57) ABSTRACT

A method for operating a traction vehicle, especially a locomotive, wherein the power delivered by a drive system is produced by at least two internal combustion engines, each of which is functionally connected to a generator for producing electric power, the engines preferably being gas engines, even more preferably lean gas engines. A previously determined number of separate power stages ranging from a minimum power up to a nominal power of the drive system is provided. The interval between all directly adjacent power stages is selected so that it corresponds to a constant fraction of the nominal power of the drive system.

20 Claims, 1 Drawing Sheet

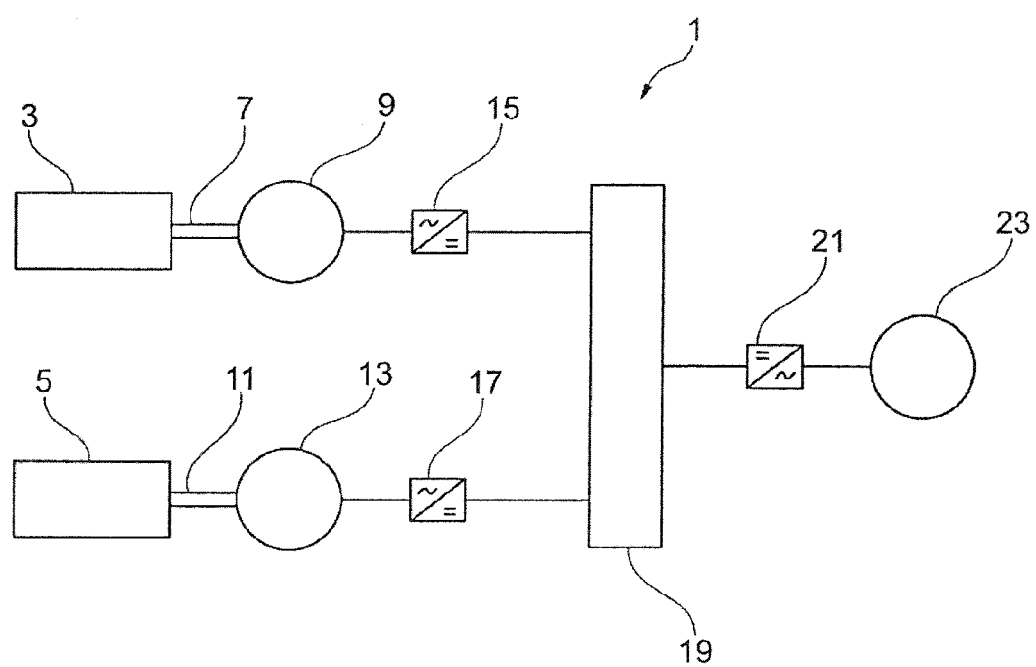

METHOD FOR OPERATING A TRACTION VEHICLE AND A TRACTION VEHICLE

CROSS-REFERENCE TO RELATED APPLICATIONS

The present application claims priority of DE 10 2012 222 514.5, filed Dec. 7, 2012, the priority of this application is hereby claimed and this application is incorporated herein by reference.

BACKGROUND OF THE INVENTION

The invention pertains to a method for operating a traction vehicle and to a traction vehicle.

Methods and traction vehicles of the type addressed here are known. In addition to diesel-electric locomotives, which comprise a single, high-power internal combustion engine functionally connected to a generator for producing electric power, wherein at least one traction motor is provided to convert the electric power into drive power, diesel-electric traction vehicles are also known which comprise at least two typically less powerful internal combustion engines, each of which is functionally connected to a generator, one of which is assigned to each of the individual internal combustion engines, to produce electric power. A composite system consisting of an internal combustion engine and a generator of this type is also called a "generator set" or GenSet for short. These traction vehicles also comprise at least one electric traction motor, preferably several of them, which are designed to convert electric power into drive power. During the operation of a traction vehicle of this type comprising a drive system of the type in question consisting of at least two generator sets, the power delivered by the drive system is produced by the at least two internal combustion engines. Regardless of whether a single, high-power internal combustion engine or several internal combustion engines less powerful than the single internal combustion engine are provided, diesel-electric traction vehicles are typically operated in such a way that a previously determined number of separate power stages is provided, which range from a minimum power stage to the nominal power of the drive system. The nominal power of the drive system corresponds to the maximum sustained power output.

It can be observed that the power stages in the known traction vehicles or in the methods for their operation are distributed nonuniformly over the power range. Comparatively many power stages are provided especially in the low power range, these stages being comparatively close together—as measured in power units—whereas comparatively few power stages farther away from each other are provided in the higher power range. For example, a first minimal power stage is provided at 4.5% of nominal power, whereas a second power stage lies at 11.5% and a third power stage at 23.5%. In contrast, the three highest power stages are at 64%, 85%, and 100%.

The result is that, when in the lower power range of the drive system, the internal combustion engine intended to produce the drive power is always being used at far below its full load. As a result, it operates in a range which is especially unfavorable with respect to efficiency and specific emissions. In addition, internal combustion engines (ICEs) which are typically designed for continuous operation at full load can hardly be used in a traction vehicle of this type, because they are not intended to be operated for prolonged periods under low, partial-load conditions.

SUMMARY OF THE INVENTION

The invention is therefore based on the goal of creating a method for operating a traction vehicle and a traction vehicle, wherein the ICEs which are used are or can be operated at more favorable load points and with lower specific emissions, wherein it is possible to use ICEs which are designed for continuous operation under full load.

The goal is achieved in a method for operating a traction vehicle, comprising the steps of: producing power delivered by a drive system by at least two internal combustion engines, each of which is functionally connected to a generator for producing electric power; providing a previously determined number of separate power stages ranging from a minimum power up to a nominal power of the drive system. This is characterized in that the interval between all directly adjacent power stages is selected so that it corresponds to a constant fraction of the nominal power of the drive system. This means that any two directly adjacent power stages are always the same distance apart—measured in power units—this distance itself being a constant fraction of the nominal power. As a result, the power stages are distributed uniformly over the entire power range from the minimum power level to the nominal power of the drive system, which leads in particular to the result that the intervals between the low power stages are larger than those known in the past. Thus an ICE activated in the low power range will operate at a higher load point, wherein it has better efficiency and improved specific emissions. For use as ICEs, it is also possible to select engines which are designed for continuous operation under full load. Because of the uniform power gradation, the at least two ICEs are especially easy to connect to each other.

The engines which are selected are preferably of the type designed for generating electric power, especially in the base-load range, wherein these power plant engines are typically operated more-or-less continuously at full load over their entire service lives or are at least designed to be operated in such a manner.

Within the scope of the method, two or more ICEs, each with its own generator, are operated in cascade fashion; in any case, at least two generator sets are operated in cascade fashion.

The ICEs used are preferably designed as gas engines, and even more preferably they are designed as lean gas engines. The gas engines, especially the lean gas engines, which are selected are preferably of the type designed to supply base-load electricity in gas-fired power plants and thus especially engines designed to be operated continuously under full load. Because of the change in the power stages, there is no need to adapt these engines to operation in the traction vehicle, because they are not operated in the extremely low partial-load range.

The ICEs are preferably operated at a constant speed, and it is preferably the delivered torque which is varied to adapt the load point.

Within the scope of the method, the traction vehicle being operated is preferably a locomotive. It is also possible within the scope of the method, however, to operate a rail motor coach, a multiple unit, or a self-propelled special-purpose vehicle, especially a so-called auxiliary vehicle with power drive such as a construction vehicle, a motorized handcar, a motorized crew car, a track renewal machine, a tower car, a track and/or tunnel measuring car, and a self-propelled road-rail car.

A method is preferred which is characterized in that eight separate power stages are provided, not counting one or possibly several no-load stages and possibly one dynamic braking stage (dynamic brake). In addition, a power stage (power stage 0) in which all of the ICEs are shut down and thus produce no power is not counted either. It is therefore possible to provide at least one no-load stage and preferably at least one dynamic braking stage in addition to the eight separate power stages. The interval between all directly adjacent power stages is selected so that it is always equal to 12.5% of the nominal power of the drive system. Accordingly, the interval between power stage 0, at which the ICEs are turned off and thus no power is being produced by the drive system, and the first power stage is precisely 12.5% of the nominal power. The interval between the first power stage to the second power stage is again 12.5% of the nominal power, and so on up to the eighth power stage, wherein a power assigned to this stage corresponds precisely to the nominal power of the drive system, that is, 100%. Thus it turns out that even the first power stage at 12.5% is not only considerably above the conventional first power stage, which is typically 4.5% of the nominal power, but also above the conventional second power stage of 11.5%. Operation of the internal combustion engines in the very low partial-load range is thus effectively avoided. The second power stage, which is preferably equal to 25% of the nominal power, lies on a higher power level than the conventional third power stage of 23.5% of the nominal power. This continues over the entire power range with the exception of the nominal power, so that the ICEs are always operating at a more favorable load point with more favorable efficiency and lower specific emissions than is conventionally the case.

A method is preferred which is characterized in that exactly two and only two ICEs are used for the drive system. Preferably each of the ICEs has the same nominal power, so that the nominal power of the drive system is preferably exactly twice as large as the nominal power of each individual ICE. The nominal power is accordingly divided symmetrically over the two ICEs. Preferably four base power stages are provided for each ICE, wherein the interval between all directly adjacent base power stages of an ICE is selected so that it is equal in each case to 25% of the nominal power of the ICE. If the nominal powers of the two ICEs are identical, the base power stages of the two ICEs are also preferably identical. In this case, exactly one of the two ICEs is operated at the lowest power stage, whereas the other is turned off. The active ICE then runs at 25% of its nominal power, which corresponds to 12.5% of the nominal power of the drive system. On the basis of this number, it is seen impressively that, for the active internal combustion engine, operation at low partial load is avoided, inasmuch as this engine operates at 25% of its nominal power when at the lowest power stage. It thus offers improved efficiency and improved, that is, reduced, specific emissions.

If four identical base power stages for exactly two ICEs are provided, these engines can be connected to each other especially easily in order to map the power stages of the drive system with help of the base power stages. This is explained in greater detail below.

The concept can obviously be expanded to traction vehicles or drive systems with more than two ICEs, wherein it is also possible to select identical nominal powers and identical base power stages for each of these, too.

A method is preferred which is characterized in that, according to a first operating mode, a first number of ICEs operates up to a previously determined power stage. The power delivered by the first number of ICEs as a function of the active power stage is set by changing the load point of the active ICEs. Starting from the higher power stage directly following the previously determined power stage, at least one additional ICE is then switched in. Whereas, therefore, the first number of ICEs is operated starting from the minimum power stage up to and including the previously determined power stage, a second number of ICEs is operated preferably starting from the next, i.e., following, power stage up to the highest power stage corresponding to the nominal power, this second number of ICEs differing from the first number by at least one additional switched-in ICE. Starting from the power stage following the previously determined power stage, the power corresponding to the active power stage is delivered in equal parts by all of the active ICEs of the drive system. The power corresponding to the active power stage is accordingly divided symmetrically over all of the operating ICEs.

In an exemplary embodiment of a traction vehicle with a drive system comprising exactly two ICEs, therefore, only the first ICE is operated up to and including a previously determined power stage, wherein the power corresponding to the active power stage is set by adjusting the load point. Starting from the power stage following immediately after the previously determined power stage, the second ICE is switched in, wherein the power to be delivered in this and in the following power stages up to the nominal power is then delivered in equal parts by the two ICEs together. It is possible in particular for the previously determined power stage to correspond exactly to the nominal power of the first ICE. In the following power stage, the load point of the first ICE is reduced in this case to half the power corresponding to the active power stage, wherein the other half of the required power is delivered by the second ICE, which has now been switched in. For the following power stages up to the highest power stage, the load points of the two ICEs are then raised in equal steps until, in the highest power stage, both ICEs are running at their nominal power and thus deliver the nominal power of the overall drive system.

In an exemplary embodiment with exactly two ICEs, it is especially preferred that the lower power stages up to and including the previously determined power stage correspond to exactly the base power stages of an ICE. At least some of the higher power stages starting from the power stage immediately following the previously determined power stage are, according to the first operating mode, no longer covered by the base power stages of the ICEs; instead, these are operated, at least in many of the power stages, at load points which do not correspond to their base power stages.

In addition or alternatively, it is provided according to a second operating mode that the power corresponding to the active power stage is delivered in equal parts by all of the ICEs of the drive system beginning from the lowest power stage up to the highest power stage. In this case, at no time is only one ICE or only a reduced number of ICEs in operation; on the contrary, all of the ICEs are in operation in all of the power stages, wherein they deliver identical power values, which add up to the power corresponding to the active power stage.

In an exemplary embodiment which comprises exactly two ICEs, therefore, both ICEs will always be operating with the identical power from the lowest power stage on, wherein this power corresponds exactly to half the power which is to be delivered according to the active power stage. At least in many of the power stages, the ICEs are preferably not operating in their base power stages in this case but rather at load points which deviate from the base power stages.

In addition or alternatively, there is a third operating mode according to which a first number of ICEs is operated up to a previously determined power stage, wherein, starting from the power stages following the previously determined power stage, at least one additional ICE is switched in. Up to this point, this corresponds to the first operating mode. In contrast to the first operating mode, however, starting from the power stage following the previously determined power stage, a power corresponding to the active stage is divided asymmetrically over the activated ICEs of the drive system. In this case, therefore the ICEs do not deliver the same power—except possibly in the highest power stage. In the higher power stages, the number of ICEs activated up to the previously determined power stage continues to operate preferably in such a way that they deliver the power corresponding to the previously determined power stage. Starting from the previously determined power stage and continuing up to the highest power stage, therefore, nothing changes with respect to the operation of the number of ICEs activated up to the previously determined power stage. The power difference versus the active power stage then present is now delivered by the at least one additional ICE or by the number of ICEs which remains after subtracting the first number of ICEs from the second number of ICEs activated starting from the power stage following the previously determined power stage.

When we again consider an exemplary embodiment which comprises exactly two ICEs, this means that, up to the previously determined power stage and at the previously determined power stage—exactly as in the case of the first operating mode—only the first ICE is activated. Here the previously determined power stage again preferably corresponds to the nominal power of the first ICE. Starting from the following power stage, the second ICE is now switched in, wherein the first ICE preferably continues to be operated at the load point at which it was operating at the previously determined load stage, preferably therefore at its nominal power. A remaining power difference versus the power to be delivered according to the active power stage is then produced by the second ICE. Accordingly, starting from the power stage following the previously determined power stage, the load point of the second ICE is raised with each additional power stage, whereas the load point of the first ICE remains the same. This is done until both ICEs are delivering their nominal powers and thus are jointly delivering the nominal power of the drive system at the highest power stage.

In an exemplary embodiment which comprises exactly two ICEs, the lower power stages up to and including the previously determined power stage preferably correspond to the base power stages of at least one of the ICEs. The higher power stages starting from the power stage following the previously determined power stage can be represented preferably as the sum of the base power stages of the ICEs, wherein different combinations of base power stages are possible. Preferably, however, as already discussed, the one ICE is operated on its highest base power stage, hence at nominal power, whereas the power difference versus the active power stage is delivered by the additional ICE, wherein the power difference preferably corresponds to exactly one of the base power stages of the additional ICE. It also becomes obvious that, according to the third operating mode, it is especially easy to connect the ICEs together, because both are always operating on a base power stage.

It turns out that the operation of the drive system in the highest power stage is the same in all three of the previously described operating modes. That is, in the highest power stage, all of the ICEs are always operating at their nominal power, wherein the nominal power of the drive system, as the highest power, is found by adding up the nominal powers of all the ICEs of the drive system.

The first operating mode is favorable to the extent that, starting from the power stage following the previously determined power stage, it is possible to change especially quickly to the next-higher power stage, because the power increase necessary for this is divided uniformly over all the ICEs, so that the individual load points must be raised to a comparatively small extent.

The second operating mode offers the advantage that it is possible to move very quickly from one power stage to the next-higher power stage over the entire power range, because, each time the power stage is changed, the corresponding power increase is distributed uniformly over all the ICEs, so that the load points need to be raised only comparatively slightly. It is therefore possible to achieve very rapid increases in power or a steep power ramp-up or a high rate of power increase in the upper power range of the first operating mode and in all power ranges according to the second operating mode. The traction vehicle can therefore be accelerated quickly.

The disadvantage, however, is that, when in the first operating mode, the ICEs operate for only a comparatively small percentage of time near the full-load point in the high power range, and in the second operating mode this is true over the entire load range. This results from the previously mentioned division of the power, wherein neither of the two ICEs is operated continuously near or at full load. This tends to be unfavorable with respect to the efficiency and specific emissions of the drive system.

The third operating mode, however, offers the advantage that the first number of ICEs (or the first ICE in cases where there are exactly two ICEs) is always operating at full load from the previously determined power stage up to the highest power stage. As the overall result, the percentage of time during which the drive system is operating at full load increases, which has favorable effects on its efficiency and specific emissions.

In this context, a method is preferred which is characterized in that, during the operation of the traction vehicle, the operating mode is changed as a function of the current requirements and/or as a function of environmental parameters. It is possible in particular to select the first, the second, or the third operating mode as a function of the current requirements and/or environmental parameters. "Current requirements" can comprise, for example, requirements pertaining to emissions or to a rate of power increase. If, therefore, the traction vehicle is to be accelerated quickly or is to increase its power quickly, preferably the second operating mode will be selected, especially in the low power range; or the first operating mode will be selected—especially in the high power range. If, however, the emissions discharged by the traction vehicle are relevant and should be reduced as much as possible, or if it is necessary to operate the traction vehicle at an especially high degree of efficiency, preferably the third operating mode will be selected.

Environmental parameters can include, for example, passage through a tunnel. Here it is possible that, because of the nearly closed atmosphere in a tunnel, exhaust gases or heated combustion air can be supplied to the ICEs, which results in operating conditions which make operation under full load appear unfavorable. For example, under these conditions, a knocking limit could be reached or exceeded under full load, which could lead to damage to the ICEs. In this case, it can be favorable when entering a tunnel to change from the third operating mode to the second mode or to the first operating mode in order to reduce the load point of an ICE running at full load. In this case, it can also be necessary to reduce the power stage of the drive system in general to avoid operating the ICEs at full load or near full load. Switching from one operating mode to another in this way can preferably be carried out automatically, wherein in particular a control unit can be used by means of which, with the help of data pertaining to the train, the route, and/or the schedule and with data on the actual position of the traction vehicle, a current and/or a future power requirement and additional requirements and/or conditions can be determined. It is possible in this way to optimize the operation of the traction vehicle especially with respect to the power stages used.

The switching-in of an additionally required ICE and/or the turning-off of an unneeded ICE is preferably handled automatically. This is preferably handled by a control unit, especially by an electronic control unit.

A method is also preferred which is characterized in that the power delivered by the drive system, at least in the lowest power stage, is divided preferably continuously between a traction component and a non-traction component. The traction component is supplied to the at least one traction motor to drive the traction vehicle. The non-traction component is preferably supplied to at least one electric load, preferably an on-board power supply. Alternatively, it is possible for the non-traction component to be converted into heat especially by a resistance element, preferably a resistor. The heat is preferably recovered and used to preheat combustion air, for example, or to preheat the fuel gas supplied to a gas engine. This is an especially favorable use of the heat, because fuel gas is typically carried along in storage elements at 250 bars and must be expanded to less than 100 mbars so that it can be burned in the gas engine. It cools considerably during such expansion, and it is therefore favorable to preheat it before it is sent to the gas engine.

To divide the power between the traction component and the non-traction component, at least one variable power resistor, preferably a continuously variable power resistor, is preferably used; it is even more preferable to use a load bank, which comprises several power resistors, especially continuously variable ones.

Thus it is possible and preferred to vary the drive power component continuously in the lowest power stage, especially to provide a variable minimum power for switchyard operation of the traction vehicle. This is favorable precisely in connection with the lower power stage, which is higher than that in known locomotives, because, under certain conditions, the lowest power stage could produce a traction so powerful that it could not be transmitted by the linkage connecting the various cars of a train together. This could ultimately lead to the result that, during startup, especially heavily loaded cars of a freight train could break off. Conversely, it is possible under certain conditions for a load-free locomotive, i.e., a locomotive traveling without any cars attached to it, to accelerate too rapidly in the inventively raised lowest power stage. Here, too, it is favorable that the traction component of the power delivered in the lowest power stage can be continuously varied and in particular that it can be decreased. The remaining power can thus—as already described—be used effectively. Alternatively, it is also possible to dissipate it to the environment as heat by way of a cooling system. For example, in the case of an embodiment of the method for the starting-off phase, only 50% of the power available in the lowest power stage is used for vehicle operation, wherein the other 50% is used for the on-board power supply, for the intake air preheater, and/or for the gas preheater or is possibly dissipated to the environment by way of a cooling system.

A method is preferred which is characterized in that operation of the ICEs under no-load conditions is avoided as completely as possible. This operating method is based on the realization that precisely the no-load condition of an ICE is extremely inefficient and produces a very high level of specific emissions. Accordingly, such an operating state is to be avoided as completely as possible for the sake of improved efficiency and reduced specific emissions. To achieve this goal, an ICE which is not needed is shut off, wherein this is preferably performed automatically. In cases where the drive system cannot take care of the on-board power supply of the traction vehicle and/or of a train pulled by it, the on-board power is preferably supplied by an auxiliary power unit (APU). Especially in an operating state in which all of the ICEs comprising the drive system, especially the exactly two ICEs comprising a preferred exemplary embodiment, are not needed, they are all preferably shut down completely. The APU is then used for the on-board power supply. This unit preferably comprises an ICE which is less powerful than the ICEs of the drive system and also a generator functionally connected to it, so that it, too, is designed as a generator set—although one on a reduced power level. In operating states in which the on-board power supply can be guaranteed by the drive system (because, for example, not all of the power generated by the drive system is being used for vehicle operation), the APU can be turned off.

The goal is also achieved by the creation of a traction vehicle that includes a drive system with at least two ICEs, to each of which a generator for producing electric power is assigned, wherein the ICEs are functionally connected to their assigned generators. At least one electric traction motor is also provided, which is designed to convert electric power into drive power. The traction vehicle is characterized in that it is set up to operate according to a method as previously described. As a result, the advantages already described in conjunction with the method are obtained.

The traction vehicle is preferably designed as a locomotive. Alternatively, it is possible for the traction vehicle to be designed as a rail motor coach, as a multiple unit, or as a self-propelled special-purpose vehicle, especially a so-called auxiliary vehicle with power drive or as a construction vehicle such as a motorized handcar, a powered crew car, a track renewal machine, a tower car, a track and/or tunnel measuring vehicle, or as a self-propelled road-rail vehicle.

The ICEs are preferably designed as gas engines, even more preferably as lean-gas engines. In particular, they are preferably designed for continuous full-load operation, wherein it is especially preferable for them to be designed in the same way as the engines provided for baseload power supply in an electricity generating plant, especially a gas-fired power plant.

The traction vehicle comprises a previously determined number of separate power stages ranging from minimum power up to a nominal power, wherein the interval between all directly adjacent power stages is selected so that it corresponds to a constant fraction of the nominal power of the drive system.

In a preferred exemplary embodiment, the traction vehicle comprises eight separate power stages—aside from at least one no-load stage and possibly a dynamic braking stage. The interval between all of the directly adjacent power stages is selected so that it corresponds in each case to 12.5% of the nominal power of the drive system.

In an especially preferred exemplary embodiment of the traction vehicle, precisely two ICEs and only two ICEs are provided, both of which preferably have the same nominal power. In this case, the nominal power of the drive system is twice as great as the nominal power of each of the two ICEs. Each ICE preferably comprises four base power stages, wherein the interval between all directly adjacent base power stages of an ICE is selected so that it corresponds in each case to 25% of the nominal power of the ICE.

A traction vehicle is especially preferred which is characterized by at least one feature required by at least one step of the method, preferably by combinations thereof. Similarly, a method is preferred which is characterized by at least one step of the method required by at least one feature of the traction vehicle, preferably by combinations thereof. To this extent, the description of the method on the one hand and of the traction vehicle on the other are to be understood as complementary to each other.

A traction vehicle is preferred which is characterized by an electronic control unit in which a method according to the invention is implemented. In particular, the preferred eight power stages and possibly at least one no-load stage and also possibly at least one dynamic braking stage as well are stored in the control unit and can be selected by it. The three operating modes previously described in connection with the method are also preferably selectable by the electronic control unit, especially as a function of a current requirement and/or environmental parameters.

Finally, a traction vehicle is preferred which is characterized by a power division device, by means of which, at least on the lowest power stage, the power delivered by the drive system can be divided preferably in continuously variable fashion between a traction component and a non-traction component.

In a preferred embodiment of the traction vehicle and in a preferred embodiment of the method, a power division of this type is also possible in the case of additional power stages, especially preferably in the case of all power stages. In addition, an exemplary embodiment of the traction vehicle or an embodiment of the method is also possible in which a corresponding power division is possible or is executed exclusively in the lowest power stage.

The power is preferably divisible in a continuously variable manner between the traction component and the non-traction component.

The non-traction component is preferably transmittable to at least one electric load, in particular an on-board power supply, so that efficient use can be made of the power component which is, so to speak, superfluous with respect to the power used by the drive system.

The power-division unit preferably comprises at least one variable power resistor. It is especially preferable for this to be designed as a continuously variable power resistor.

In the case of a preferred exemplary embodiment, the power-division unit comprises a load bank, which comprises a plurality of power resistors, especially of continuously variable power resistors. It is possible in this case for the power being released as heat in the power resistor or in the load bank to be recovered and sent to a heat consumer such as to the intake air preheater or to the fuel gas preheater, or it can be dissipated to the environment by means of a cooling unit.

The various features of novelty which characterize the invention are pointed out with particularity in the claims annexed to and forming a part of the disclosure. For a better understanding of the invention, its operating advantages, specific objects attained by its use, reference should be had to the drawings and descriptive matter in which there are illustrated and described preferred embodiments of the invention.

BRIEF DESCRIPTION OF THE DRAWING

In the drawing:

The single FIGURE is a schematic representation of an exemplary embodiment of a drive system of a traction vehicle preferably designed as a locomotive.

DETAILED DESCRIPTION OF THE INVENTION

The exemplary embodiment of a drive system 1 shown in the FIGURE comprises a first ICE 3 and a second ICE 5. These are designed as lean-gas engines, and the ICEs used to drive the locomotive (not shown) are of a design which is intended for continuous operation under full load, especially in the baseload supply range of a gas-fired power plant.

The first ICE 3 is functionally connected by a shaft 7 to a generator 9 for producing electric power. In a corresponding manner, the second ICE 5 is functionally connected by a shaft 11 to an electric generator 13. The generators 9, 13 generate a preferably 3-phase alternating voltage, which is rectified by the rectifiers 15, 17 and sent to an intermediate circuit 19. From the intermediate circuit 19, it is also possible, for example, to feed an on-board power supply (not shown). Accordingly, it is also possible for an auxiliary power unit (APU), not shown in the FIGURE, to be electrically connected to the intermediate circuit 19, so that it can feed electric power to the intermediate circuit 19 for the on-board power supply. By way of an inverter 21, electric power is supplied from the intermediate circuit 19 to at least one traction motor 23, which converts this into drive power and drives a drive axle of the locomotive.

The traction vehicle comprises preferably more than one traction motor, in particular four or six traction motors, preferably one traction motor for each drive axle. In the case of a locomotive, two bogies are preferably provided, each of which comprises two or three drive axles, one traction motor being assigned to each drive axle.

The traction motors, as in the case of the traction motor 23 shown in the FIGURE, are preferably designed as alternating current (AC) motors. In another exemplary embodiment, the traction motors are designed as direct-current (DC) motors. In this case, they can be fed either directly from the intermediate circuit 19 or by way of a converter unit connected electrically between the intermediate circuit 19 and the traction motors, this converter unit comprising in particular an inverter and a rectifier. Various possibilities of equipping a traction vehicle with traction motors are generally known, so that there is no need to discuss this aspect in detail here.

In a dynamic braking state, it is possible for the drive axle to be driven by the kinetic energy of the locomotive, wherein the traction motor 23 is reconfigured as a generator. The electric power generated in it is then sent to the intermediate circuit 19 via the inverter 21, functioning now as a rectifier.

In the exemplary embodiment shown here, the first ICE 3 and the second ICE 5 each have a nominal power of 1600 kW. This means that the drive system 1 has a nominal power of 3200 kW.

Aside from at least one no-load stage and a dynamic braking stage, the drive system 1 comprises eight power stages, which are distributed symmetrically over the entire load range, wherein the interval between all directly adjacent power stages is a constant 12.5% of the nominal power and therefore 400 kW.

Accordingly, the power assigned to the first power stage is 400 kW, that to the second is 800 kW, that to the third is 1200 kW, that to the fourth is 1600 kW, that to the fifth is 2000 kW, that to the sixth is 2400 kW, that to the seventh is 2800, and that to the eighth and highest power stage is the nominal power of the drive system 1 or 3200 kW.

Each of the two ICEs 3, 5 comprises four base power stages, wherein the interval between all directly adjacent base power stages is a constant 25% of the nominal power of the ICE, which, for a nominal power of 1600 kW, also corresponds to 400 kW. The four base power stages of the two ICEs 3, 5 are therefore situated at powers of 400 kW, 800 kW, 1200 kW, and 1600 kW.

According to the first operating mode of the drive system 1, it is provided in the case of the exemplary embodiment shown in the FIGURE that one of the ICEs 3, 5, e.g., the first ICE 3, is operated alone up to a previously determined power stage, namely, the fourth power stage of the drive system 1, which in this case corresponds to the fourth base power stage of the ICE 3, 5. In the first operating mode, the first power stage of the drive system 1 thus corresponds to the first base power stage of the active ICE 3, 5, the second power stage to the second base power stage, the third power stage to the third base power stage, and the fourth power stage to the fourth base power stage.

Only from the fifth power stage on is the other one of the two ICEs 3, 5, e.g., the second ICE 5, switched in, wherein, according to the first operating mode, the power to be delivered according to the fifth power stage, namely, 2000 kW, is divided symmetrically between the two ICEs, so that each of the ICEs delivers 1000 kW. Accordingly, the base power stages are no longer in effect. In the sixth power stage, each of the two ICEs correspondingly delivers 1200 kW—which corresponds to the third base power stage; in the seventh power stage, each delivers 1400 kW; and in the eighth power stage, each delivers its nominal power, namely, 1600 kW. Starting from the fifth power stage and continuing up to the eighth power stage, each of the ICEs is required to handle a power increase of only 200 kW, and for this reason it is possible to select a faster rate of increase than would be possible if one of the ICEs were required to handle a larger power step.

According to the second operating mode, both ICEs 3,5 operate jointly starting from the lowest power stage, wherein the power is always divided equally between the two ICEs. Correspondingly, each of the ICEs 3, 5 delivers 200 kW in the first power stage, 400 kW in the second power stage, 600 kW in the third, 800 kW in the fourth, 1000 in the fifth, 1200 kW in the sixth, 1400 kW in the seventh, and 1600 kW in the eighth. In this operating mode, the two ICEs are required to handle power steps of only 200 kW starting from the lowest power stage, and for this reason it is possible to select a high power increase rate; that is, the power can be increased along a steep curve. This means in particular that the locomotive can accelerate quickly. In exchange, this operating mode has the effect of considerably reducing the percentage of time during which the ICEs operate at full load. They therefore rarely operate near or at full load.

The third operating mode corresponds exactly to the first operating mode with respect to the first four power stages. In the fifth to the eighth power stage, however, the ICE also active in the first to fourth power stages preferably continues to operate in its fourth power stage, that is, at its nominal power stage of 1600 kW, while the other ICE, e.g., the second ICE 5, is responsible only for producing the power difference versus the active power stage. This ICE, which is not active in the first four power stages, thus operates in its first base power stage, namely, 400 kW, when the fifth power stage is active; in its second base power stage, namely at 800 kW, when the sixth power stage is active; in its third base power stage, namely, 1200 kW, when the seventh power stage is active; and in its fourth base power stage, namely, at 1600 kW, when the eighth power stage is active. Thus it becomes immediately clear that, in the third operating mode, the percentage of time which the ICEs spend under full-load operating conditions and also under operating conditions near the full-load point is especially large. They thus operate especially frequently or intensively in a range which is favorable with respect to efficiency and emissions.

In the first and third operating modes, it is especially preferred as a basic principle that the ICEs which are activated in the first four power stages (in the exemplary embodiment with exactly two ICEs, therefore, the ICE active in the first four power stages) and the ICEs running at high power, namely, at their nominal power, in the fifth to the eighth power stage (in the exemplary embodiment with exactly two ICEs, therefore, again the ICE always operating at full load in the upper power stages five to eight according to the third operating mode) exchange their roles. The exchange is preferably carried out in such a way that, overall, in terms of the average total running time of the drive system 1, all of the ICEs, in particular the two ICEs 3, 5, operate in the end for the same number of hours. The ICEs therefore have uniform running times. Typically an exchange of this type is carried out after the drive system 1 has been shut down or just after it is been started up again. Alternatively or in addition, it is also possible, however, for such an exchange to be carried out during the operation of the drive system 1.

With respect to the various operating modes, it is found that other combinations of power stages, base power stages, and/or reduced load points are also possible. In particular, when more than two ICEs or more than two generator sets are being used, a large number of possible combinations is conceivable.

In the first power stage, it is possible and preferred for the power of 400 kW delivered by the drive system 1 to be divided variably between a traction component supplied to the traction motor 23 and a non-traction component preferably supplied to an electric power consumer. To this end, a variable power resistor is used, preferably a continuously variable power resistor, and even more preferably a load bank. It is therefore possible, for example, to divide the 400 kW produced in the first power stage in such a way that, for example, 200 kW are available as drive power, wherein the remaining 200 kW are sent to the consumer or used in some other way.

The method described above is especially suitable for implementation when an existing traction vehicle which has never operated by means of the method is being remotorized. In particular, it is possible to replace the existing ICEs of a traction vehicle, such as its diesel engines, with gas engines, especially lean-gas engines, and to take this opportunity to implement the method. It is possible in this way to retrofit a conventional traction vehicle and thus to obtain a traction vehicle of the type described here. It is also possible in particular to retrofit existing traction vehicles comprising DC traction motors, especially so-called AC/DC locomotives, so that they can be operated according to the method.

Overall it is found that, with the help of the method and the traction vehicle, it is possible to operate with at least two ICEs in a manner optimized with respect to efficiency and emissions, wherein, because of the raising of the load point, it is possible in particular to use ICEs which are designed for continuous operation at full load.

While specific embodiments of the invention have been shown and described in detail to illustrate the inventive principles, it will be understood that the invention may be embodied otherwise without departing from such principles.

I claim:

1. A method for operating a traction vehicle, comprising the steps of: producing power delivered by a drive system by at least two internal combustion engines, each of which is functionally connected to a generator for producing electric power; and providing a previously determined number of separate power stages ranging from a minimum power up to a nominal Dower of the drive system; wherein an interval between all directly adjacent power stages corresponds to a constant fraction of the nominal power of the drive system.

2. The method according to claim 1, wherein eight separate power stages, aside from a no-load stage and a dynamic braking stage, are provided, wherein the interval between all directly adjacent power stages is selected so that it corresponds in each case to 12.5% of the nominal power of the drive system.

3. The method according to claim 1, including using exactly two internal combustion engines for the drive system.

4. The method according to claim 3, wherein the internal combustion engines have an equal nominal power, wherein the nominal power of the drive system is twice as large as the nominal power of each of the two individual internal combustion engines.

5. The method according to claim 4, wherein four base power stages are provided for each internal combustion engine, wherein the interval between all directly adjacent base power stages of an internal combustion engine is selected so that the interval corresponds in each case to 25% of the nominal power of the internal combustion engine.

6. The method according to claim 1, wherein, according to a first operating mode, a first number of internal combustion engines operates up to a previously determined power stage, wherein, starting from a power stage following the previously determined power stage, at least one additional internal combustion engine is switched in, and wherein, starting from the power stage following the previously determined power stage, a power corresponding to the active power stage is delivered in equal parts by all activated internal combustion engines of the drive system; or, according to a second operating mode, the power corresponding to the active power stage is produced in equal parts by all of the internal combustion engines of the drive system beginning from the minimum power stage; or, according to a third operating mode, a first number of internal combustion engines operates up to a previously determined power stage, wherein, starting from a power stage following the previously determined power stage, at least one additional internal combustion engine is switched in, and wherein, starting from the power stage following the previously determined power stage, a power corresponding to the active power stage is divided asymmetrically over the activated internal combustion engines of the power system, wherein the number of internal combustion engines activated up to the previously determined power stage continues to produce a power corresponding to the previously determined power stage, wherein a power difference versus the active power stage is produced by the at least one additional internal combustion engine.

7. The method according to claim 6, including changing the operating mode during operation of the traction vehicle, wherein the first, the second, or the third operating mode is selected as a function of a current requirement and/or as a function of environmental parameters.

8. The method according to claim 7, wherein the current requirement is a requirement on emissions or a rate of power increase.

9. The method according to claim 1, including dividing power produced by the drive system, at least in the minimum power stage between a traction component and a non-traction component, wherein the non-traction component is supplied to at least one electric power consumer.

10. The method according to claim 9, including dividing the power in a continuously variable manner.

11. The method according to claim 9, including using at least one variable power resister to divide the power between the traction component and the non-traction component.

12. The method according to claim 1, including automatically turning off an internal combustion engine which is not needed so that operation of the internal combustion engines under no-load conditions is substantially avoided.

13. The method according to claim 12, including providing on-board power from an auxiliary power unit at times when the on-board power supply cannot be guaranteed by the drive system.

14. A traction vehicle, comprising a drive system having at least two internal combustion engines; at least two generators, each of the internal combustion engines being functionally connected to a respective one of the generators for producing electric power; and at least one electric traction motor, which is designed to convert electric power into drive power, wherein the traction vehicle is set up to operate in accordance with the method according to claim 1.

15. The traction vehicle according to claim 14, wherein the internal combustion engines are gas engines.

16. The traction vehicle according to claim 15, wherein the gas engines are lean gas engines.

17. The traction vehicle according to claim 14, further comprising an electronic control unit that selects intervals between directly adjacent power stages of the drive system so that the interval corresponds to a constant fraction of a nominal power of the drive system.

18. The traction vehicle according to claim 14, further comprising a power dividing device at least in a lowest power stage, power produced by the drive system between a traction component and a non-traction component, wherein the non-traction component is suppliable to at least one electric power consumer.

19. The traction vehicle according to claim 18, wherein the power dividing device comprises at least one variable power resistor.

20. The traction vehicle according to claim 19, wherein the power dividing device includes a continuously variable power resistor or a load bank.

* * * * *